United States Patent [19]

Harrison

[11] 4,051,891

[45] Oct. 4, 1977

[54] HEAT TRANSFER BLOCK MEANS

[75] Inventor: Henry Harrison, Locust Valley, N.Y.

[73] Assignee: Halm Instrument Co., Inc., Glen Head, N.Y.

[21] Appl. No.: 618,502

[22] Filed: Oct. 1, 1975

[51] Int. Cl.² .......................... F24D 5/02; F24D 5/10; F24D 11/00; F24H 7/02
[52] U.S. Cl. ...................................... 165/54; 126/270; 126/400; 165/18; 165/DIG. 4; 237/1 A
[58] Field of Search .................. 126/400, 270; 165/45, 165/9.1, 9.4, 18, 53, 54; 237/1 A

[56] References Cited

U.S. PATENT DOCUMENTS

| 965,391 | 7/1910 | Little | 237/1 A |
|---|---|---|---|
| 1,953,342 | 4/1934 | Foell | 165/9.4 |
| 2,680,565 | 6/1954 | Löf | 165/18 X |
| 2,898,091 | 8/1959 | Verbeek | 126/400 X |
| 3,295,591 | 1/1967 | Thomason | 126/400 |
| 3,666,006 | 5/1972 | Valyi | 165/164 |
| 3,732,919 | 5/1973 | Wilson | 165/166 X |
| 3,885,529 | 5/1975 | Renzi | 165/165 |
| 3,893,506 | 7/1975 | Laing | 237/1 A X |
| 3,894,685 | 7/1975 | Keyes et al. | 126/270 X |
| 3,981,151 | 9/1976 | St. Clair | 126/270 X |

OTHER PUBLICATIONS

Fully Solar-Heated House, Bliss, Jr.; Raymond W., Air Conditioning, Heating and Ventilating, Oct., 1955, pp. 92-97.

Primary Examiner—Carroll B. Dority, Jr.
Assistant Examiner—Sheldon Richter
Attorney, Agent, or Firm—James P. Malone

[57] ABSTRACT

A heat transfer block has a center core of substantially equally sized stones. The stones are grouted together with voids in between. Upper and lower panels are grouted to the center core. At least one of the panels is a heat transmitting panel. A plurality of heat transfer blocks may be laid end to end to form a heat transfer duct. A building air heating system may comprise a plurality of heat transfer blocks connected together, a means of circulating air through the blocks, and a heat reservoir connected to the outer surface of said heat transfer blocks.

2 Claims, 4 Drawing Figures

HEAT TRANSFER BLOCK MEANS

This invention relates to heat transfer block means and more particularly, to modular heat transfer blocks comprising a core of stones sandwiched between heat transfer panels.

There is a need for modular inexpensive heat transfer means for instance, for transferring heat between circulating air and passive heat storage reservoirs. The present invention provides inexpensive, modular heat transfer blocks which may be installed in various configurations depending upon a particular problem.

The heat transfer blocks of the present invention comprise a center core of substantially equally sized stones which are grouted or cemented together at their touching surfaces with voids in between. Upper and lower panels are grouted or cemented to the center core. At least one of the panels is a heat transfer panel.

Accordingly, a principal object of the invention is to provide new and improved heat transfer means.

Another object of the invention is to provide new and improved heat transfer modular duct means.

Another object of the invention is to provide new and improved heat transfer block means which are inexpensive and modular and may be used in various configurations.

Another object of the invention is to provide new and improved heat transfer block means comprising a core of substantially equally sized stones, said stones being cemented together with voids in between, and at least one heat transmitting panel cemented to the core.

These and other objects of the invention will be apparent from the following specification and drawings, of which:

Figure 1:
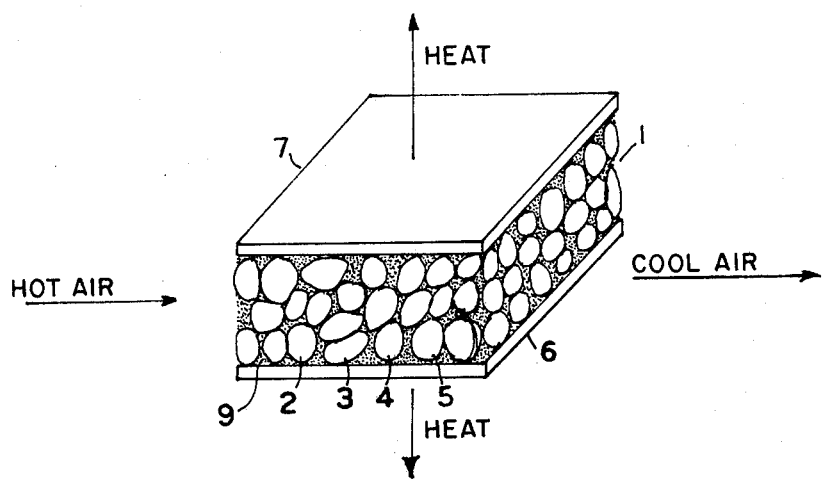
FIG. 1 is a perspective view of an embodiment of the invention.

Referring to FIG. 1, the heat transfer block of the present invention provides a center core 1, consisting of a plurality of substantially equally sized stones 2, 3, 4, 5, etc. The stones are grouted or cemented together at their contact surfaces by grout or cement. The center core may be formed by dipping or otherwise contacting the stones in grout or adhesive material and then placing them in a form, the lower panel 6, being placed or cast in the bottom of the form. The upper panel 7, may be placed or cast on top of the assembly. When the grout or adhesive has hardened, the block assembly is removed from the form. The block may be of any convenient size, for instance, 6 to 8 inches deep and one foot square.

At least one of the panels 6 and 7 is a heat transfer panel and may be of cement. If it is desired to transmit heat in only one direction then the opposite panel could be omitted. A hard flat surface, not grouted to the stones, will then contact them in only a few places, and the heat transfer rate from the stones to such hard surface will be much less than to the grouted panel.

If it is desired to form a duct with the heat transfer blocks they are laid end to end and side, top or bottom panels may be added if desired.

The heat transfer panels may be formed in a duct, in contact with heat storage material, so that they store or withdraw from storage heat for a building. Such a use is illustrated in FIGS. 2 and 3.

Figure 2:
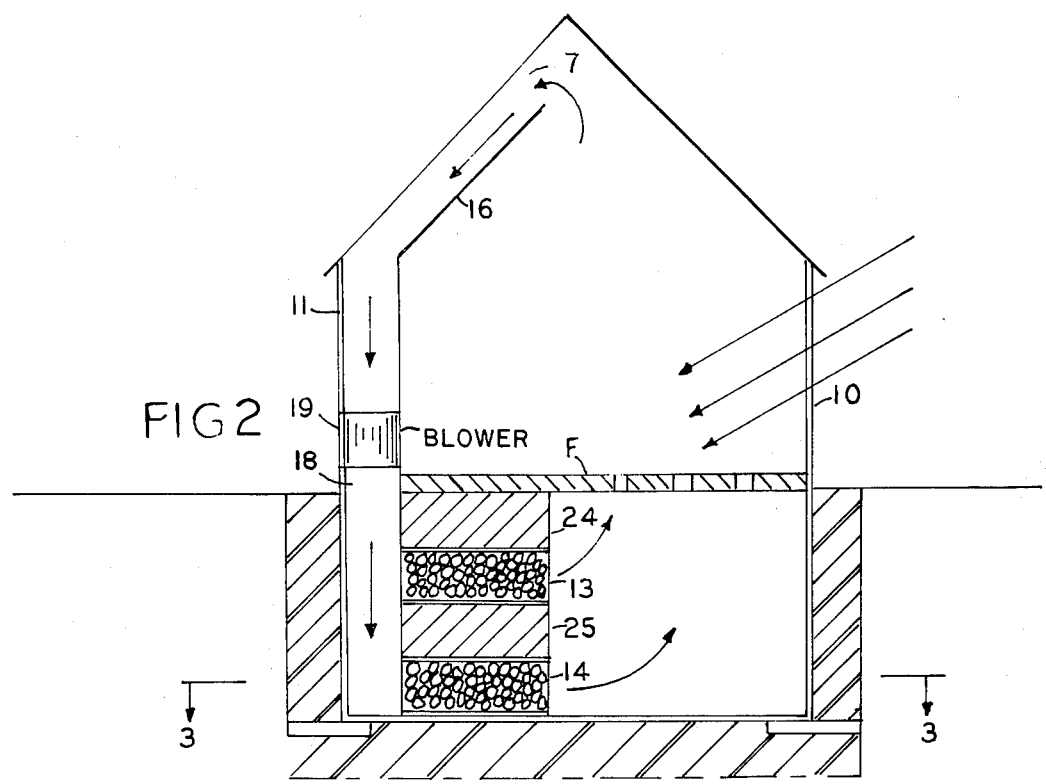
FIG. 2 is a sectional view of a building illustrating the use of the invention, taken along the line 2—2 of FIG. 3.

FIG. 2 shows a building having a glass window 10, facing southerly to receive the sun's rays, and a northerly wall 11. The heat blocks 13, 14, 15, etc., may be laid in a pattern between layers 24, 25, and 26, of passive heat storage material such as compacted soil. Heated air from the top of the building is supplied to the input duct 16, connected to the heat transfer blocks via intake 17, duct 18 and blower 19. This air will circulate through the heat transfer blocks 14, 15, transmitting heat to the heat storage layers.

Figure 3:
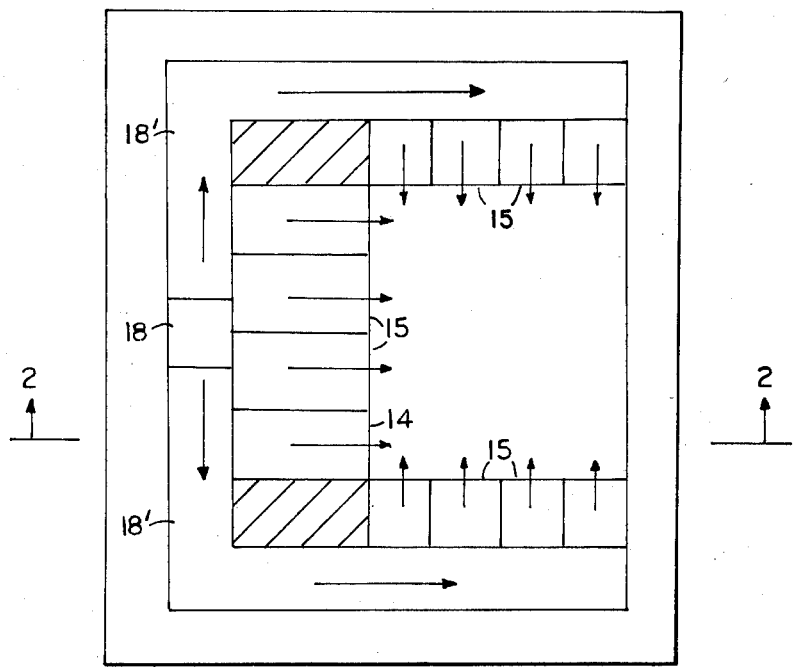
FIG. 3 is a sectional view taken along the line 3—3 of FIG. 2.

In FIG. 3, one possible pattern of heat transfer blocks is shown in plan view as a double-row U-shaped configuration, illustrating how air can be brought to them by a duct 18'. Depending on building shape and heat storage, various configurations of heat transfer ducts may be made with the modular heat transfer blocks of the present invention.

A major virtue of this grouted stone heat transfer device is that it conductively joins the large area of the stones of the core with large heat storage capacity outside the panel surfaces. Thus, the length of air passage through the stone may be much less and the flow resistance and fan power required, much less than in conventional rock bed heat storage. This comparison is illustrated in FIG. 4, where temperature and pressure drop are plotted as a function of length through the heat transfer blocks or stone bed.

Figure 4:
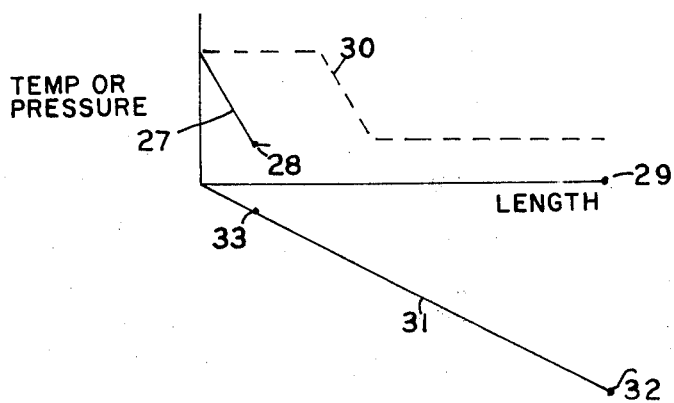
FIG. 4 is a diagram comparing the temperature distribution and pressure drop in the heat transfer block of the present invention, to corresponding values for a conventional heat storage rock bed.

In FIG. 4, is a plot 27, of temperature in the heat transfer block, which has length indicated by 28. The corresponding temperature distribution in a conventional ungrouted stone bed having the same size stones, is the dotted curve 30. However, since the heat storage capacity of a conventional stone bed is all localized in the stones, which have small thermal contact with flanking heat storage reservoirs, the length of stone bed 29, is much greater than the length of heat transfer block 28, in combination with the flanking heat storage reservoirs, for the same amount of heat storage. The line 31, which represents the pressure drop in the air flowing through the stones, shows that the pressure drop 33 in the heat transfer block is much less than the corresponding pressure drop 32 for the conventional stone bed.

I claim:

1. Heat transfer means comprising a plurality of modular heat transfer blocks adapted to form a passage for heat transfer fluid, exchanging heat with heat storage materials, when heat transfer blocks being in layered contact with said heat storage materials, each of said heat transfer blocks comprising a center core of substantially equally sized stones,
    said stones being cemented together with voids in between,
    and at least one modular heat transmitting panel cemented to the center core.

2. Heat storage means comprising a plurality of modular heat transfer blocks arranged to form a heat exchange passage for heat transfer fluid, exchanging heat with heat storage materials, said heat transfer blocks being in layered contact with said heat storage material, each of said heat transfer blocks comprising a center core of substantially equally sized stones,
    said stones being cemented together with voids in between,
    and at least one modular heat transmitting panel cemented to the center core.

* * * * *